United States Patent Office 3,451,823
Patented June 24, 1969

3,451,823
EXTRACTION PROCESS
Abraham R. Mishkin and William C. Marsh, Marysville, Alfred W. Fobes, Columbus, and Joseph L. Ohler, Marysville, Ohio, assignors to Afico S.A., a corporation of Switzerland
Filed Nov. 17, 1965, Ser. No. 513,643
Claims priority, application Switzerland, Nov. 24, 1964, 15,124/64
Int. Cl. A23f 3/02
U.S. Cl. 99—77          13 Claims

ABSTRACT OF THE DISCLOSURE

A process for preparing a tea extract which comprises extracting dry tea with water at relatively elevated temperatures to produce a first extract, comminuting a quantity of at least partially extracted tea and adding water thereto to provide a pumpable slurry, heating the slurry at a higher temperature and under pressure to provide a second extract and combining the first and second extracts.

---

Figure 1:
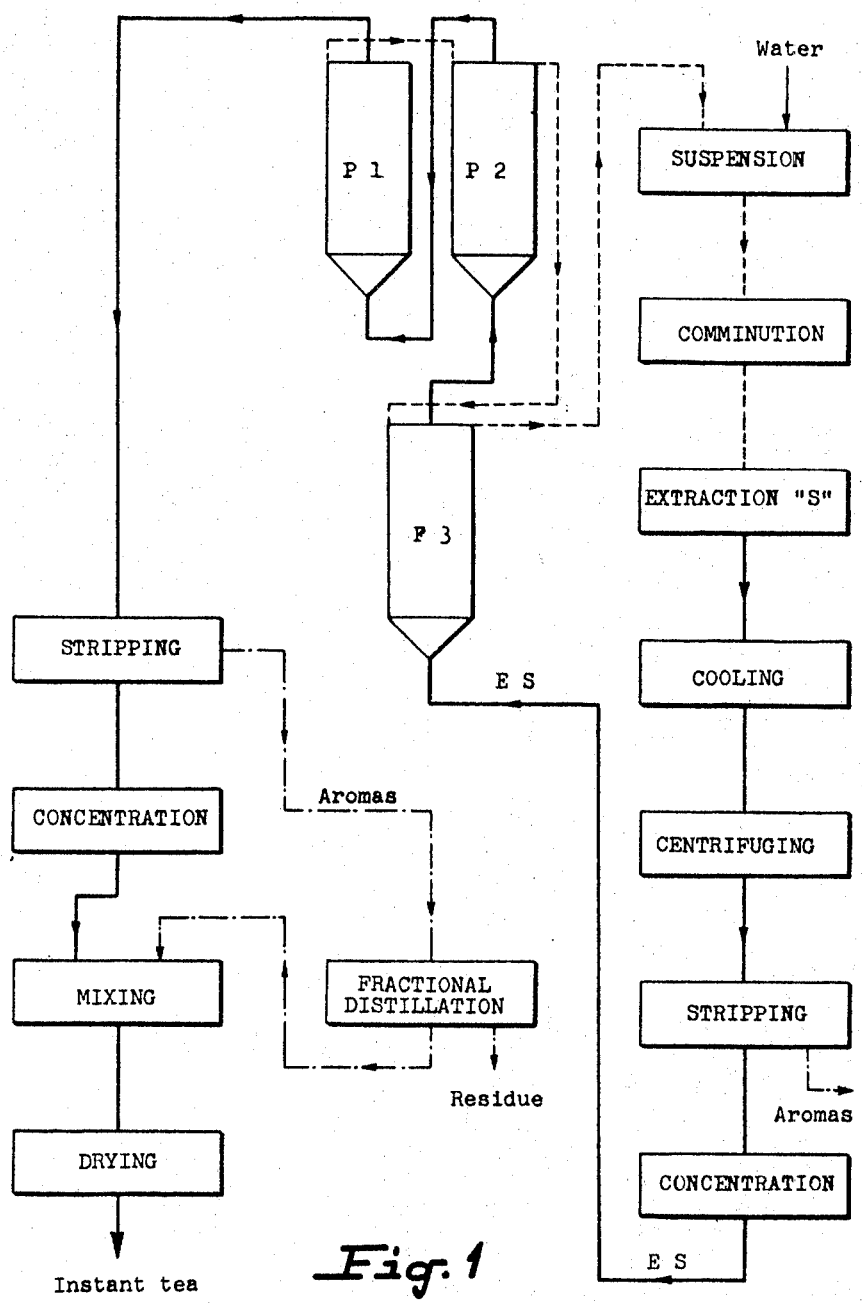

The invention relates in general to novel methods of manufacture of food products and more particularly to methods to be used in the preparation of instant tea.

Manufacture of instant tea products has become an important industry in the last few years, especially in the United States. A common extraction process consists of placing the dried tea leaves in one or more extraction cells and percolating hot water up through the cells until all the available soluble solids have been dissolved. The resulting tea solution or extract is then stripped to remove volatile flavours and aromas, clarified and condensed by evaporation. The volatile liquids are added back to the concentrated liquor and the mixture is dried to a soluble powder which is marketed under the name of instant tea. The yield of soluble solids obtained from such a process is usually poor. Efforts have been made to increase the yield by raising the extraction water temperature, but these have generally failed because higher temperatures tend to cause a break-down of the cellular structure of the tea leaves thereby causing them to soften and block the exit screens in the extraction cells; also, extracts produced at the elevated temperatures yield soluble powders with undesirable flavours, colours, aromas and textures.

Another commercially feasible method of making instant tea is the slurry extraction process. In the slurry extraction process the tea leaves are usually pulverized and mixed with water to form a pumpable slurry which is then passed through tubular reactors. Thereafter the spent tea leaves are separated from the tea solution by centrifugation or filtration.

A two or more stage slurry process in which the first stage is reacted at temperatures about 90° C. and the following stages at higher temperatures can produce fairly acceptable instant tea powder at good yields but the product lacks the pleasing flavour, aroma, colour and texture of the instant tea produced according to the invention.

An object of the present invention is to provide methods whereby the tea solids obtained as additional products from the tea leaves may be made pleasant to the taste and smell and have the proper colour so that they are beneficial rather than detrimental to the final instant tea.

The present invention is based on the observation that a high-quality instant tea product may be produced by combining the percolator and slurry extraction techniques. Stated broadly, the invention consists of extracting dry tea with water at temperatures not exceeding about 110° C. to provide a first extract, comminuting the extracted tea with sufficient water to yield a pumpable slurry, subjecting the slurry to high temperatures and pressures for a short time, removing the insoluble matter from the slurry to provide a second extract, combining the second extract with the first low-temperature extract optionally and drying the combined extracts in a conventional apparatus such as a spray drier.

The present invention thus provides a process for preparing a tea extract which comprises extracting dry tea with water at temperatures not exceeding about 110° C. to provide a first extract, comminuting a quantity of at least partially extracted tea and adding water thereto to provide a pumpable slurry, heating the slurry to a temperature in excess of 180° C. to provide a second extract, and combining said first and second extracts.

For example, the process may be carried out by first extracting dry tea in a typical cell system using extraction water at about 105° C. The spent leaves from the extraction cells are pulverized to a slurry with water and pumped into suitable reactors where the slurry is subjected to high temperatures and pressures. The slurry extract, if desired after stripping and concentrating, may then be added to the low temperature extract. The combined extracts may then be dried, giving a soluble tea product at high yield and which has a very pleasant taste, aroma, colour and powder texture.

In accordance with the present invention, various modifications may be made in the process described above. In one preferred embodiment, the slurry extract may be passed through one or more of the cells containing tea which has been wholly or partially extracted. The cell acts as a filter bed and the extract may be further purified in this way. If desired, water may be passed through the cell or cells in the filtering operation, thereby recovering any soluble tea solids which were absorbed by the filter bed.

For the production of cold-water soluble tea extracts, the extract which is produced by the process according to the invention may be solubilized by any of the conventional processes. For example, the tea tannins may be separated by cooling the extract to about 0° C. and then oxidizing the cold water insoluble tannins with oxygen, hydrogen peroxide or ozone.

Alternatively, the cold-water insoluble tea solids may be solubilized by any of the processes described in U.S. Patents Nos. 2,831,772, 3,065,077 and 3,151,985. Thus, for example, the extract may be treated with a systematically-innocuous sulphite.

Figure 6:
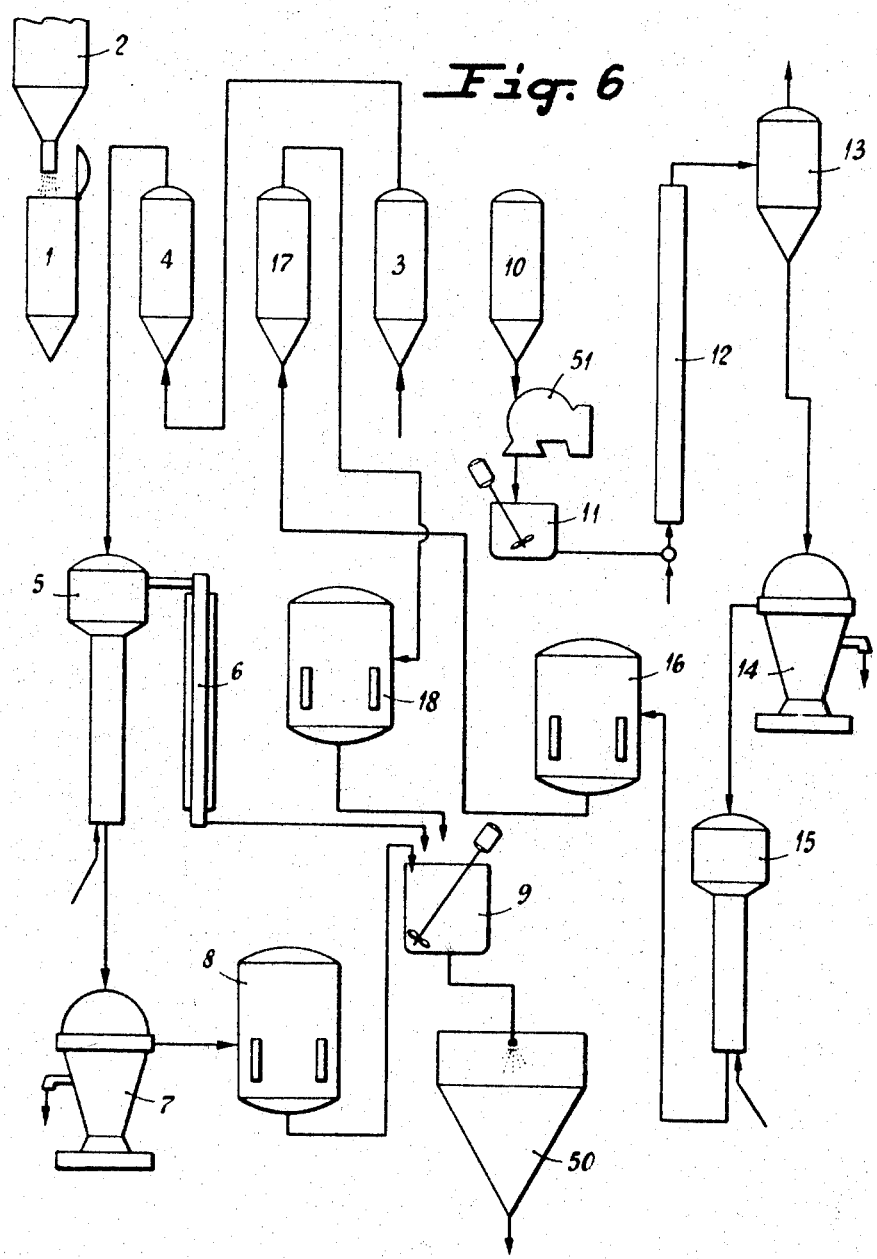
Figure 7:
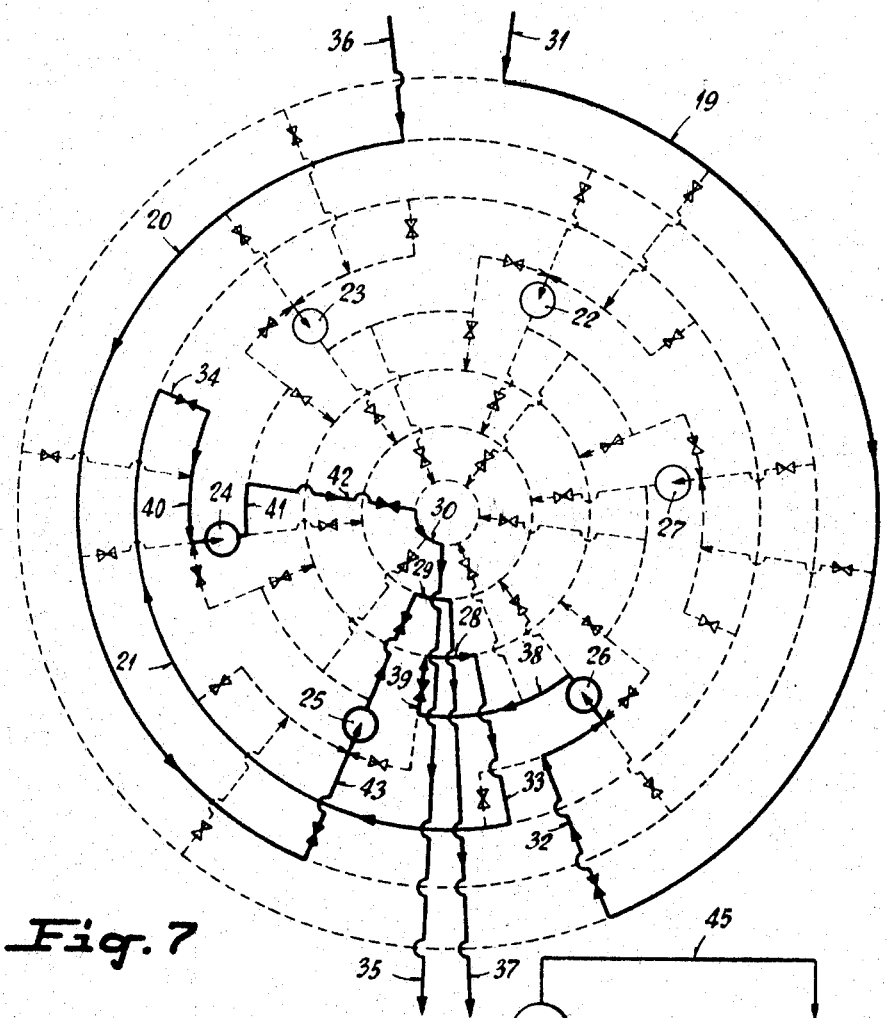
Figure 8:
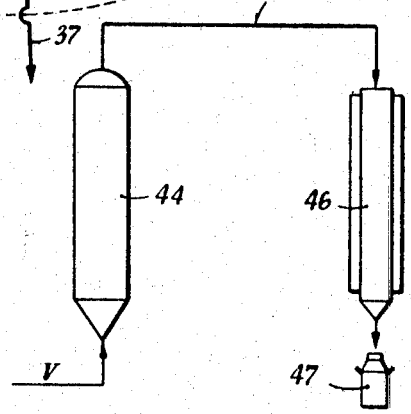

Several preferred embodiments of the process according to the invention are further explained with reference to the accompanying drawings, in which:

FIGURES 1 to 5 are flowsheets showing five preferred variations of the process;
FIGURE 6 of the drawings shows in further detail a process flow diagram of a tea manufacturing process;
FIGURE 7 of the drawings is a schematic diagram of the piping arrangement to and from the cells which allows the cell extraction and the slurry reaction processes to take place simultaneously;
FIGURE 8 of the drawings shows an apparatus suitable for the preparation of tea leaf distillate.

In the flow-sheets shown in FIGURES 1 to 5 of the accompanying drawings,

P1, 2 . . . refers to percolation cells
F1, 2 . . . refers to filter cell
(the number 1 indicating fresh tea leaves and the higher numbers the degree to which the leaves are exhausted)
S refers to the slurry extraction process
E represents the various extracts,
the continuous line represents the path followed by the extracts and the dotted and dot-dash lines, respectively, the path of the tea leaves and the volatile aromas.

Referring to FIGURE 1, the percolator which has just been filled with fresh tea is also filled with water, prior to its being utilized in the counter-current extraction system. The spent tea from cell F3 which has been partially extracted in the percolator extraction system is mixed with water in a slurry tank. The tea/water suspension is passed through a comminuting machine in order to reduce the size of the extracted tea leaves so that they may be pumped easily through the high-temperature section of the extraction system, where the slurry is contacted with live steam, thereby raising its temperature to about 205° C. The slurry extraction may, for example, be carried out in an apparatus of the type described in British specification No. 946,346. The residence time of the slurry in the high-temperature section is about 10 minutes. Following the extraction, the slurry is flash-cooled and the grounds are separated from the extract is a horizontal, desludging-type centrifuge. The extract ES may then be stripped and/or partially concentrated before it is returned to the percolator extraction system. The high-temperature extract, representing a yield of 22% based on the original dry tea, is passed through cell F3, containing partially extracted tea which acts as a filter bed. The filtered extract is heated to about 100° C. and passed through the cells P2 and P1, the cell P1 containing fresh tea. The extract from cell P1 is then pumped to the counter-current stripping column and concentrated. The distillate from the stripping operation is added to the concentrated extracts and then the mixture is dried as an instant tea.

Figure 2:
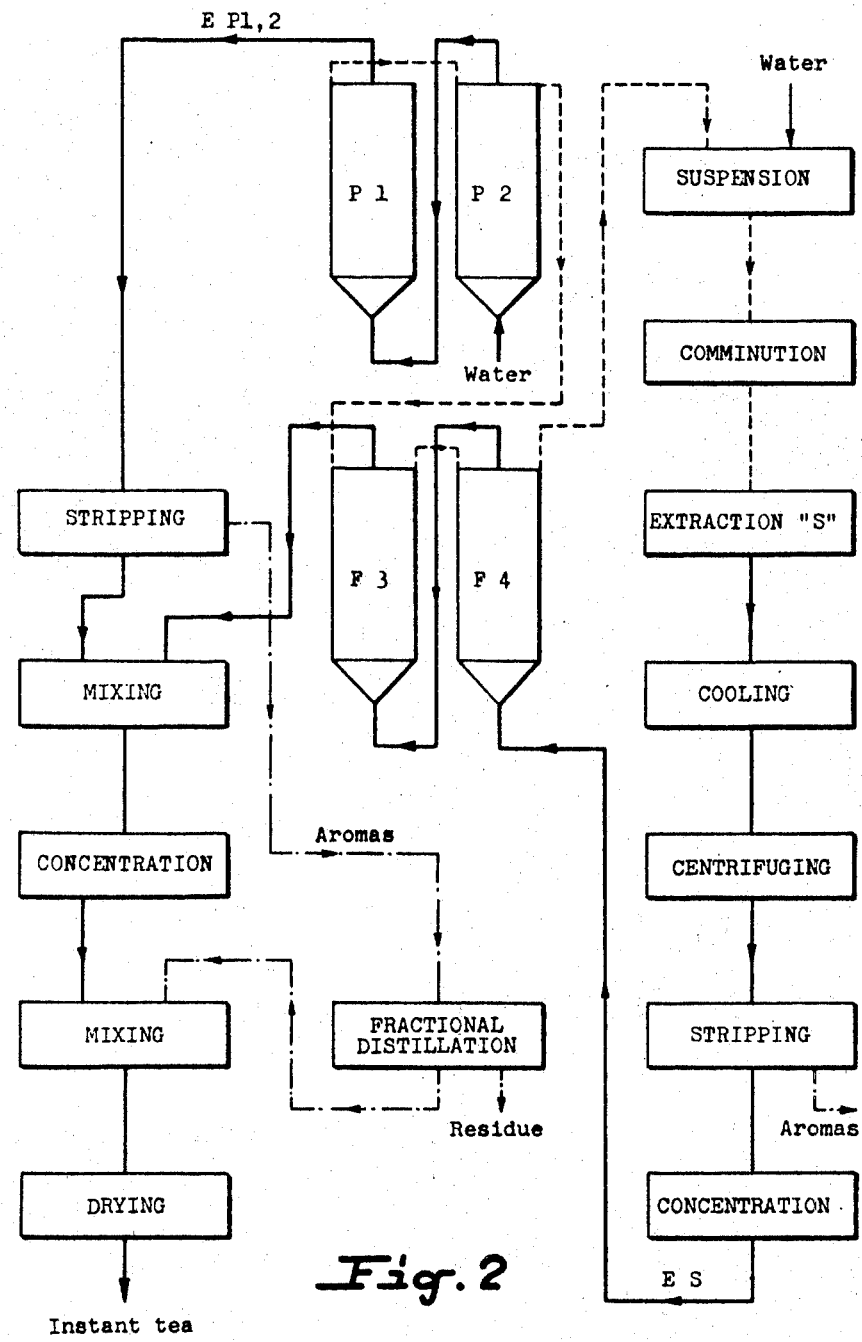

In FIGURE 2 of the accompanying drawing, the use of a two-stream draw-off for the extraction of the tea in the percolator system is shown, the two extracts being combined before drying. Water at about 95° C. is used for the extraction of cells P2 and P1, the latter containing fresh tea. The high temperature slurry extract is simultaneously pumped in counter-current fashion through cells F3 and F4, which act as a filter. The resulting spent leaves are employed for the preparation of extract ES, under conditions similar to those described in connection with FIGURE 1. After centrifuging and stripping, it is concentrated and filtered by passage thorugh cells F3 and F4. The filtered extract ES is combined with the extract emerging from cell P1 after the P1 extract has been stripped. As described in connection with FIGURE 1, the aromatics obtained by stripping extract EP1, 2 are added to the combined extracts which are then dried. In one modification, only a portion of extract ES is stripped.

Figure 3:
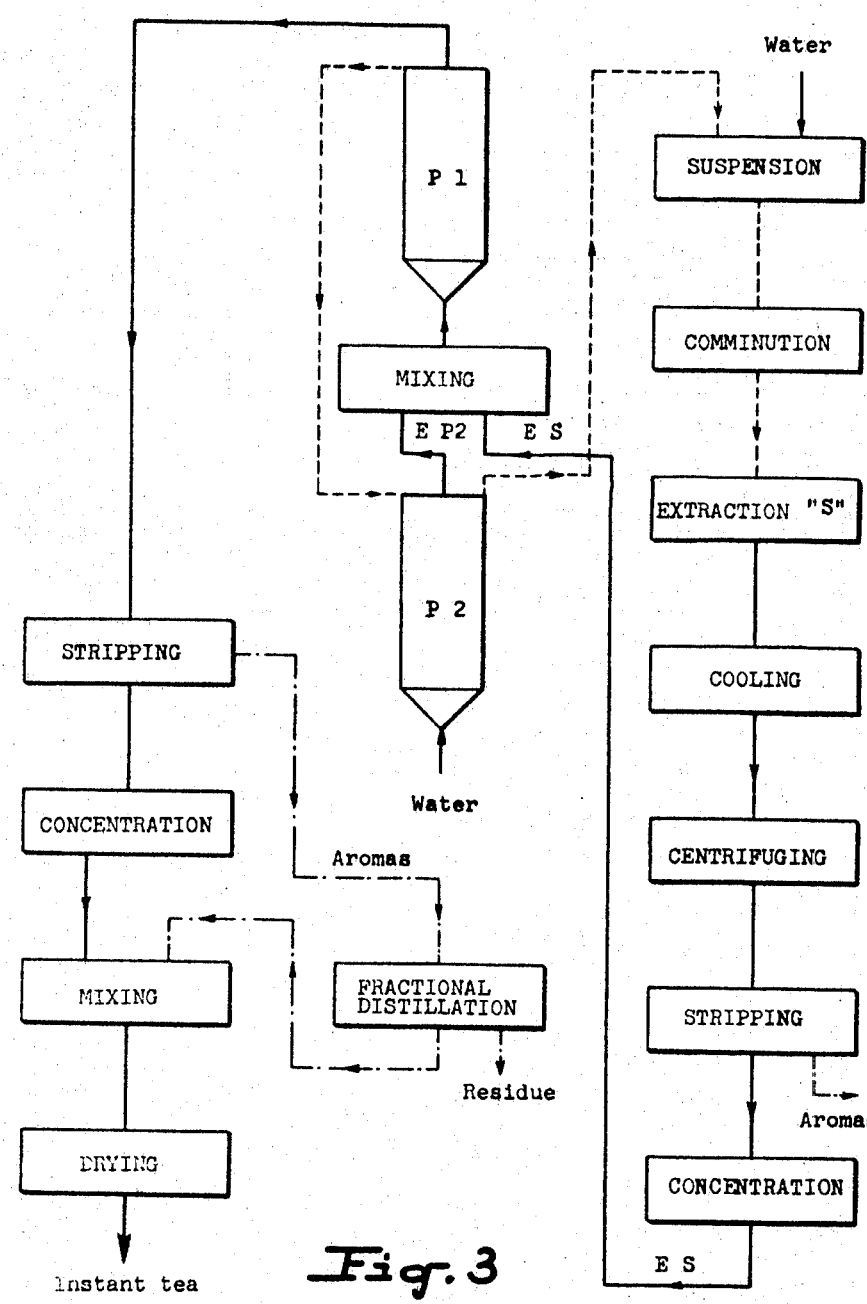

The procedure shown in FIGURE 3 involves a two-cell extraction technique. The cell P2 contains partially-spent leaves from which extract EP2 is obtained. The leaves are then comminuted and extracted under slurry conditions, as described with regard to FIGURE 1, to obtain extract ES. This extract is concentrated from approximately 10 parts extract to one part of original tea to 4 parts of extract to one part of the original tea and is mixed with extract EP2. The water extraction of the two percolators is carried out in counter-current fashion, while the concentrated high-temperature slurry extract is continuously metered into the bottom for the first position extractor, which acts as a filter bed for the extract. The single extract stream is subjected to counter-current stripping in order to remove the volatile tea aromatics, which, after re-stripping, are added to the spray mix.

Figure 4:
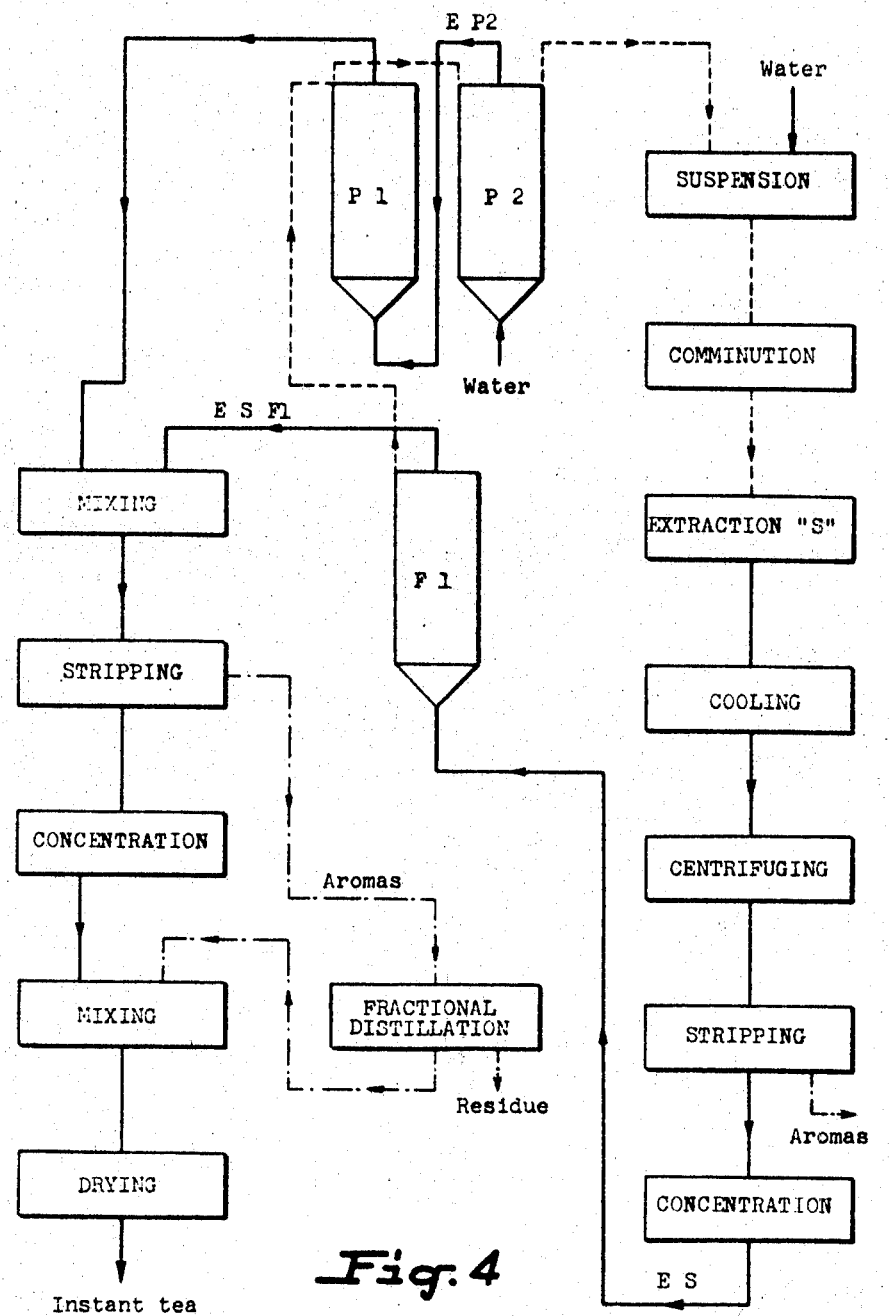

FIGURE 4 shows a modification of the process shown in FIGURE 3 wherein the partially concentrated extract ES is filtered in cell F1 containing fresh dry tea. Cell F1 then becomes P1 and is then extracted with extract EP2. The resulting extract is combined with extract ESF1 and the process continued as described with reference to FIGURE 3.

Figure 5:
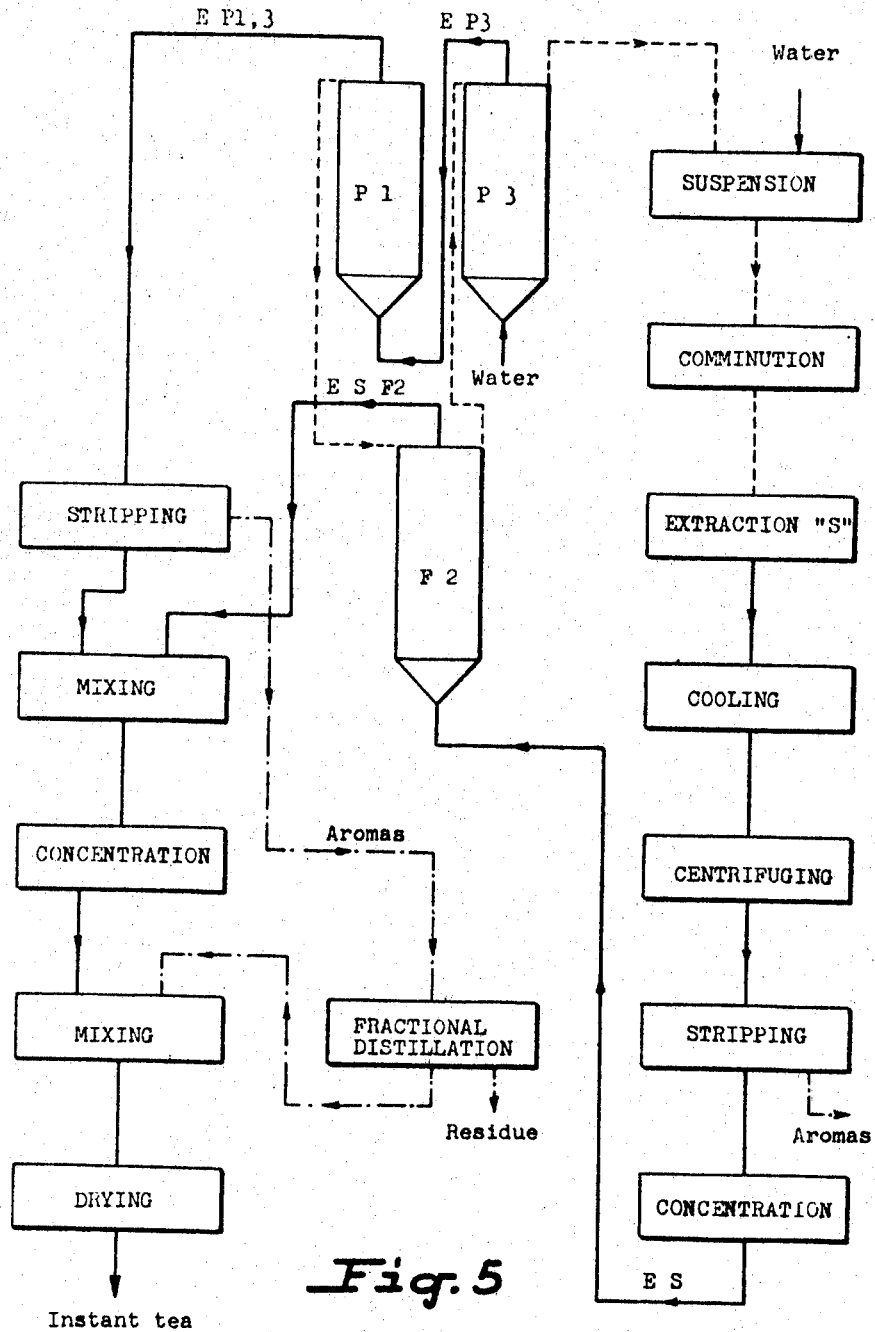

FIGURE 5 illustrates a variant of the process shown in FIGURE 2. The extract ES is prepared from spent leaves obtained from the filter cell F2 after extraction in cell P3 when extract EP3 is prepared. The leaves from cell P3 are suspended in water and extracted under slurry conditions as described with reference to FIGURE 2. Extract EP3 is passed to cell P1, containing fresh tea, thus obtaining combined extract EP1, 3 which is mixed with extract ESF2 and the combined extracts are then treated according to FIGURE 2.

Referring now to FIGURE 6, the tea leaves are loaded into the cell 1 from a weigh-hopper 2. The filled cell is now designated 4 and it is connected in seires with cell 3, containing partially-spent leaves. Water at about 105° C. is percolated up through the cells 3 and 4 and the extract then passes to a stripping column 5 where the volatile flavours and aromas are removed and condensed out by the condenser 6. The extract then passes to a centrifuge 7 where broken tea leaves and insoluble tannins are removed. The clarified extract then passes to the evaporator or vacuum pan 8 where much of the water is removed as vapor. The concentrated tea solution then passes to a storage tank 9 where the aromatic distilate from the condenser 6 is added. The spent tea leaves left in the cell 3, which after extraction becomes 10, are removed and pulverized in a hammer mill 51 and then passed into a slurry mixing tank 11 where more water is mixed in to give a pumpable slurry. The slurry is pumped to the high pressure reactor 12 where live steam is added and the temperature is increased to the vicinity of 205° C. The residence time in the reactor is about ten minutes. The reaction temperature is very important with respect to the quality of the final product which will be obtained. The desired reaction product is a reddish coloured soluble solid which will mix with and enhance the colour and appearance of the final soluble tea. If too low a reaction temperature is used, such as 175° C., an undesirable greenish powdered product is obtained. If the temperature is too high, such as 235° C., final instant tea products of less desirable flavour and aroma are obtained. After leaving the reactor 12, the slurry is rapidly cooled by means of a flash cooler 13 and passes to a centrifuge 14 which removes the tea leaves. These are discarded. The clarified solution then passes through a stripping column 15 counter-current to steam which removes much of the undesirable flavours and aromas. The solution then passes to an evaporator 16 which removes 60 to 70% of the water and then enters the bottom of the filter cell 17 full of spent tea leaves and percolates up through it, whereby the solution is further clarified and purified. The solution then passes to another vacuum pan 18 where it is further concentrated and then to the storage tank 9 where it is mixed with concentrated extract from the cells and the distillate. The resulting spray mix is then pumped to the spray dried 50 where it is dried to give a soluble instant tea powder.

Alternatively, instead of passing through the filter cell 17, the extract may be drawn off from evaporator 16 and blended with the extract from cell 4 after it has been passed through the stripping column 5. The combined extracts are then clarified in centrifuge 7 and subjected to a solubilization reaction, after which they are evaporated and passed directly to the storage tank 9.

With reference to FIGURE 7, the large outer circles 19, 20, 21 represent inlet headers to the bottoms of the cells 22, 23, 24, 25, 26, 27. The inner circles 28, 29, 30 represent exit headers from the tops of the same cells. The cells are connected with the various headers by means of pipes with suitable valves so that the extraction operation and filtering operation as described above may take place simultaneously.

In each extraction cycle, the extracts flow through three of the six cells whereas of the remaining three one is being charged with fresh tea, the second, containing fresh tea, is being wetted with water whilst the third, containing spent leaves, is being emptied. The quantity of extract passing through any cell may be measured as desired (volumetrically or gravimetrically) and when the desired quantity has passed a new cycle of operations is commenced.

As an example, the operation of the apparatus as applied to the process shown in FIGURE 5 is described below. The continuous line represents the piping actually used whereas the remainder, shown by the broken lines, represents the other circuits which are held in readiness for the succeeding cycle. Cells numbered 24, 25 and 26 are in use. Simultaneously, cell 27 is emptied by blowing in steam and the spent leaves are used for preparing the slurry. Cell 22 is being filled with dry tea leaves. Cell 23 is being wetted with water by means of a hose (not shown). Extraction water passes into the outer header through line 31 and then into cell 26 (P3, FIGURE 5) through connecting lines 19 and 32. The water passes through the cell and the extract coming out is drawn off via lines 38, 39, 28, 33 and bypasses the filter cell 25 by moving through the outer header 21. Thence the extract passes into the bottom of cell 24 (P1, FIGURE 5) through pipelines 34 and 40, passes through the cell and exits via lines 41 and 42 to header 30 from where it passes to the stripping column by means of pipeline 35. The slurry extract to be filtered enters the system through line 36 whence it is led to the bottom of cell 25 (F2, FIGURE 5) which it enters via the header 20 and line 43. The filtered extract leaves the cell through line 43 and, via header 29, passes through pipeline 37 to the storage tank where it is combined with the first extract (EP1, 2; FIGURE 5). When the desired quantity of extract has been drawn, the valves are changed and a new extraction cycle is commenced, involving cells 23, 24 and 25. The filter cell 25 is preferably located between the two extraction cells 24 and 26 so that any extract which remains in the cell at the end of the cycle is displaced with extraction water rather than being emptied into the slurry tank and recycled through the high temperature process.

As previously indicated, additional flavour may be added to the tea product by steam stripping fresh dry tea leaves in the cells, condensing out the distillate and adding it to the spray mix. The apparatus shown in FIGURE 8 is suitable for this purpose. A jet steam V is passed through a cell of dry tea leaves. The vapors pass through duct 45 and are condensed out by condenser 46 and collected in container 47. The resulting tea leaf distillate is then added to the spray mix in the storage tank 9 (FIGURE 6. Although addition of such a distillate to instant tea made by cell extraction methods or slurry methods alone generally causes the product to become unbalanced, addition of the distillate to the high-yield cell-slurry product enhances its flavour and aroma.

The following examples are given for the purpose of illustration only:

Example 1

The manufacturing process applied to the production of instant tea using the apparatus described with reference to FIGURE 6 of the drawing is allowed to operate for a number of hours until all conditions reach steady state. A commercial grade of Ceylon black tea is supplied to the empty cells and consumed at an average rate of 45.4 kg. per hour. Water at 105° C. is introduced to the extraction system, producing 545 kg. of extract per hour, assaying 3.53% tea solids. The tea extract is steam stripped in a bubble cap stripping column which yields 6.8 kg. per hour of aromatic distillate. The extract is centrifuged to remove insolubles and the clarified extract then evaporated in a vacuum pan to give 30 kg. per hour of heavy liquor assaying 65% tea solids. The distillate is added to the heavy liquor giving 36.5 kg. per hour of mix assaying 52.9% solids. The spent cells are blown out with steam and the spent leaves fed through a hammer mill where they are pulverized and thereafter fed to the slurry mixing tank where sufficient water is added to make a slurry containing 6.6% solids. The slurry is then pumped into the tubular reactor where steam is directly injected to bring the temperature to 205° C. The residence time in the reactor is ten minutes after which the slurry is flash cooled and centrifuged to remove the insolubles. The reaction product rate is 345 kg. per hour at 1.44% soluble solids. The reaction product is steam stripped and concentrated to 3.48% soluble solids in a vacuum pan. The partially concentrated solution is then pumped through the filter cell and the effluent concentrated further in a second vacuum pan to give 2.3 kg. per hour of heavy liquor containing 50% soluble solids. It should be noted that the actual yield gained from the slurry state is greater than the calculated yield since a part of the partially concentrated reaction product remains in the filter cell at the end of each cycle. Likewise the actual yield from the extraction is lower than calculated, since the slurry solids in the filter cell are displaced by the extraction water at the beginning of the extraction cycle. A cell extraction at 105° C. under similar conditions gives a 34% yield. The filtered, concentrated heavy liquor from the slurry reaction is passed to the storage tank and mixed with the first extract giving 38.8 kg. per hour of spray mix at 52.8% soluble solids. The spray mix is then dried in the spray drier to give 20.4 kg. per hour of instant tea powder having a pleasing taste, aroma, colour and powder texture.

Example 2

A tea manufacturing process consisting of a cell extraction and a slurry reaction system is allowed to operate until a steady state is reached. The process is similar to that described in Example 1 except that the slurry reaction product is passed through the filter cell before any evaporation takes place. The filtered effluent is then mixed with the stripped clarified extract and both are concentrated in a vacuum pan in a single step. The average feed to the cells is 45.4 kg. per hour of Ceylon black tea. Water at 105° C. is introduced to the extraction system giving an extract which is stripped yielding 7.3 kg. of aromatic distillate and then clarified. The clarified extract is fed along with reaction product to the vacuum pan. The extract enters at a rate of 545 kg. per hour and assays 3.10% soluble solids. Water is added to the pulverized spent tea leaves to give a slurry having 6.6% total solids content. The slurry is reacted at 205° C. for 10 minutes and then centrifuged and steam stripped after which the reaction product is pumped through the filter cell. The clarified reaction product from the filter cell, consisting of 345 kg. per hour at 1.00% soluble solids, is fed to the vacuum pan where it is mixed with cell extract as mentioned above. Heavy liquor at 65% soluble solids leaves the pan at 31.3 kg. per hour. Distillate is added to the heavy liquor giving 38.6 kg. of spray mix at 53% soluble solids. Ninety percent of the spray mix is dried in the spray drier to give 18.4 kg. per hour of instant tea powder having a pleasing taste, aroma, and powder texture. The aroma and flavour are amplified by mixing ten percent of the spray mix with tea leaf distillate, freeze drying this mixture and blending the freeze dried product, or essence, back with the spray dried solids. The tea leaf distillate is obtained by steam stripping dry tea leaves in the cell before extraction in such a manner that 2.98 kg. of distillate is obtained for each 45.4 kg. of dry tea used. The distillate is then added to 3.84 kg. spray mix giving 6.8 kg. of essence at 30% soluble solids.

The essence is freeze dried and blended with the spray dried instant tea giving 20.4 kg. per hour of a very pleasant instant tea product.

Example 3

A tea manufacturing process consisting of a cell extraction system and a slurry reaction system is allowed to operate until a steady state is reached. The process differs from those described so far in that the reaction product is not filtered through an extraction cell and the solids are made cold water soluble by means of the process described in U.S. Patent No. 2,831,772. The average feed to the extraction cells is 45.4 kg. per hour of Ceylon black tea. Water at 105° C is introduced to the extraction cells at an average rate of 545 kg. per hour producing 545 kg. of extract per hour assaying 2.83% tea solids. The tea extract is steam stripped in a bubble cap stripping column which yields 7.1 kg. per hour of aromatic distillate. The spent leaves from the cell extraction are blown from the cells with steam, pulverized in a hammer mill and mixed with water to give a slurry containing 6.6% solids. The slurry is then pumped into a tubular reactor where steam is directly injected to bring the temperature up to 205° C. The residence time at 205° C. is approximately 10 minutes. The reaction product is then flash cooled and centrifuged to remove the insoluble tea leaves. The effluent solution is steam stripped and concentrated in an evaporator to remove undesirable flavours and aromas. The product from the evaporator, 167 kg. per hour at 3.0% solids, is then mixed with the cell extract and pumped through a cooler which cools the mixture to 9° C. The mixture is then passed through a centrifuge to remove the cold water insoluble tannins, thus giving 557 kg. of a clear effluent per hour at 2.52% cold water soluble solids. The cold insoluble tannins are heated at 88° C. for four hours in the presence of a small quantity of sodium sulphite according to the method described in U.S. Patent No. 2,831,772, cooled again to 9° C. and centrifuged producing an additional 48.0 kg. per hour of 8.75% cold water soluble solids. The solubilized tannins are then added to the other clarified liquor making 612 kg. per hour of liquor containing 3.03% cold water soluble tea solids.

The liquor is then evaporated to 65% solids and the distillate added, producing 35.2 kg. of spray mix per hour at 52% soluble solids. The spray mix is dried in the spray drier, which produces 18.3 kg. per hour of cold water soluble instant tea with very pleasant taste, aroma, colour and powder texture.

We claim:

1. Process for preparing a tea extract which comprises extracting dry tea with water at an elevated temperature not exceeding about 110° C. to provide a first extract comminuting a quantity of at least partially extracted tea and adding water thereto to provide a pumpable slurry, heating the slurry at a temperature in excess of 180° C. and high pressure to provide a second extract, subjecting the second extract to an aroma-stripping reaction, discarding the stripped aroma therefrom and thereafter combining said first and second extract.

2. Process according to claim 1 in which the slurry is heated for about ten minutes at a temperature of about 205° C.

3. Process according to claim 1 in which, before the second extract is combined with the first extract, the insoluble matter is removed from the second extract and the said second extract is rapidly cooled and concentrated.

4. Process according to claim 1 in which the slurried second extract is centrifuged to separate the insolubles and filtered thereafter prior to being subjected to an aroma-stripping reaction.

5. Process according to claim 1 in which the first extract is subjected to an aroma-stripping reaction and the stripped aromas are added to the combined first and second extracts.

6. Process according to claim 1 in which the second extract is passed through a quantity of partially or wholly extracted tea before it is combined with the first extract.

7. Process according to claim 1 in which the second extract is passed through partially extracted tea simultaneously with the first extract.

8. Process according to claim 1 in which before the extraction steam is passed through the dry tea to provide an aromatic distillate which is condensed and added to the combined first and second extracts.

9. Process according to claim 1 in which the combined first and second extracts are solubilized.

10. Process according to claim 1 in which the combined extracts are dried to provide a powdered tea extract.

11. Process according to claim 8 in which the aromatic distillate is added to a predetermined percentage of the combined first and second extracts, the mixture is freeze-dried and, after the remainder of the combined extracts has been dried, the freeze-dried aromatic product is added to the dried combined extracts.

12. Process according to claim 4 in which the second extract is passed through a quantity of partially or wholly extracted tea before it is combined with the first extract.

13. Process according to claim 4 in which the second extract is passed through partially extracted tea simultaneously with the first extract.

References Cited

UNITED STATES PATENTS

| | | | |
|---|---|---|---|
| 2,785,979 | 3/1957 | Mitchell | 99—77 |
| 2,831,772 | 4/1958 | Herz | 99—77 |
| 3,244,533 | 4/1966 | Clinton et al. | 99—71 |

FOREIGN PATENTS 247,043   5/1963   Australia.

MAURICE W. GREENSTEIN, *Primary Examiner.*